Aug. 21, 1956 C. F. ROBINSON 2,760,080
RADIOLOGICAL METER
Filed Sept. 7, 1951

INVENTOR.
CHARLES F. ROBINSON
BY James B. Christie
ATTORNEY.

United States Patent Office 2,760,080
Patented Aug. 21, 1956

2,760,080

RADIOLOGICAL METER

Charles F. Robinson, Pasadena, Calif., assignor, by mesne assignments, to Consolidated Electrodynamics Corporation, Pasadena, Calif., a corporation of California Application September 7, 1951, Serial No. 245,575

10 Claims. (Cl. 250—83.6)

This invention relates to a combined radiological dose rate and integrated dose meter.

Heretofore it has been common practice to provide separate radiological meters for measuring the dose rate and the integrated dose of radioactive radiation.

In accordance with the present invention apparatus is provided for measuring both the dose rate and the integrated dose of radioactive radiation during the same period of time with a single radiological meter.

The apparatus of the invention comprises an ionization chamber, a resistor having a very large resistance, and a capacitor which may be charged to a predetermined voltage, connected in series in a circuit forming a closed loop. The measurements are made by means of a voltmeter which may be selectively connected across the capacitor or across the serially connected capacitor and resistor, or which may be selectively connected across the capacitor or the resistor.

The invention will be more fully understood from the following description and the drawings, in which.

Figure 1:
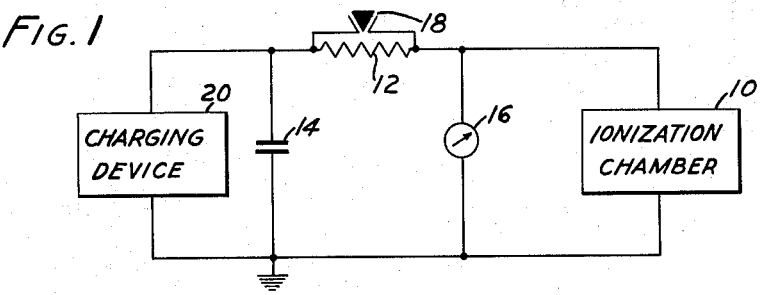
Fig. 1 is a schematic diagram of one embodiment of the invention.

In the apparatus shown in Fig. 1, an ionization chamber 10, a resistor 12 having a very large resistance, and a capacitor 14 having a small capacitance are connected in series in a circuit forming a closed loop. A voltmeter 16 is connected in shunt with the ionization chamber, and a push button switch 18 is connected in shunt with the resistor.

A charging device 20 is connected in shunt with the condenser 14. Preferably, the charging device is an electrostatic type such as shown in co-pending application Serial No. 244,992 filed on September 4, 1951 now Patent No. 2,671,177, by Robinson and Lahti.

The operation of the radiological meter is initiated by charging the condenser 14 to a predetermined potential which is measured with the voltmeter 16, then the charging device 20 is de-activated and the dose rate and the integrated dose of radioactive radiation are determined from the indications provided by the voltmeter 16.

The calibration of the voltmeter 16 may be determined as follows: If the capacitor 14 has a capacitance of $2.5 \times 10^{-12}$ farad, the maximum charging voltage is 1000 volts so that the maximum charge on the condenser is $2.5 \times 10^{-9}$ coulomb, and the charge sensitivity of the ionization chamber 10 is $10^{-8}$ coulomb per roentgen unit of radiation received, then a dose rate of 10 milli-roentgen per minute causes a current of $1.67 \times 10^{-12}$ ampere to flow through the ionization chamber. If the resistor 12 has a resistance of $10^{14}$ ohms, a dose rate of 10 milli-roentgen per minute will cause a potential drop of 167 volts across the resistor 12. When the switch 18 is opened, a potential drop of 167 volts across the resistor 12 will cause the indicator of the voltmeter 16 to move .167 of the full scale of the voltmeter, if the full scale of the voltmeter is 1000 volts.

In this example, an integrated dose of $2.5 \times 10^{-1}$ roentgen unit will completely discharge the condenser 14, and the integrated dose over a period of time is indicated by the decrease in the potential measured by the voltmeter 16 during the period of time.

Figure 2:
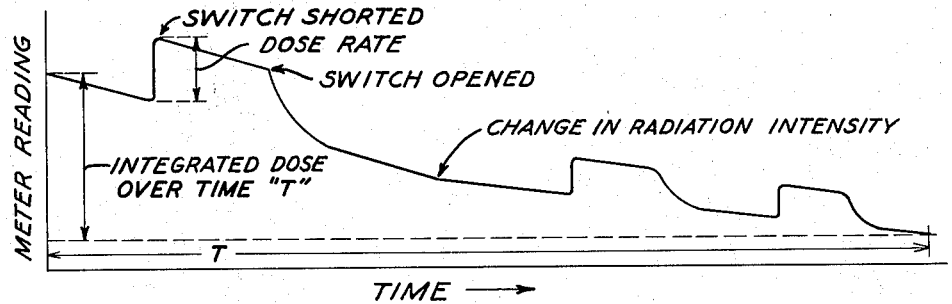
Fig. 2 is a curve which illustrates the operation of the apparatus shown in Fig. 1.

The curve shown in Fig. 2 illustrates how the voltmeter reading changes with time when the apparatus is employed to measure the dose rate and the integrated dose of radiation over a period of time.

The charging device 20 is operated until the condenser 14 is fully charged, as indicated by full scale deflection of the voltmeter 16 when the switch 18 is shorted. The switch 18 is then opened, and the dose rate may be measured at various instants throughout the period of time during which the integrated dose is being measured, merely by shorting the switch 18 and observing the increase in the reading of the voltmeter 16. The integrated dose is measured by observing the reading of the voltmeter 16 at the start and at the end of the period of time, both readings being made with the switch 18 in the same position, i. e., either opened or closed.

The apparatus shown in Fig. 1 is primarily suitable for use with an ionization chamber which has an electrostatic voltmeter as an integral part thereof.

Figure 3:
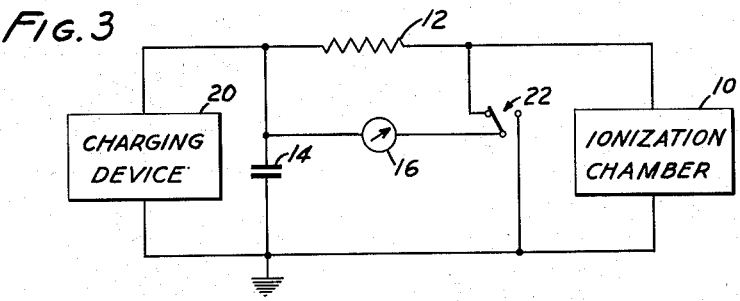
Figs. 3 and 4 are modifications of the apparatus shown in Fig. 1.
Figure 4:
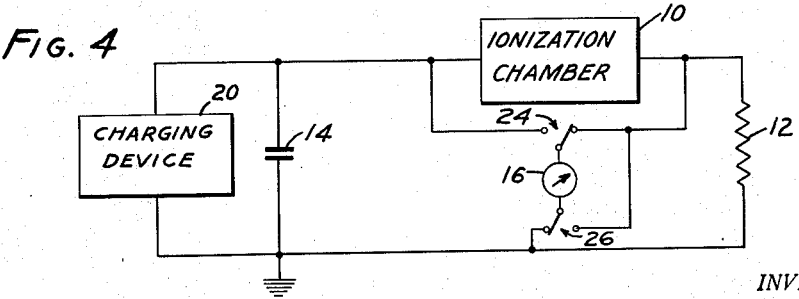

If a separate ionization chamber and voltmeter are employed the apparatus may be modified as shown in Figs. 3 or 4.

In the apparatus shown in Fig. 3, a double throw switch 22 is employed to connect the voltmeter 16 across either the resistor 12 or the condenser 14. In operation, the switch 22 is first employed to cause the voltmeter 16 to measure the potential across the condenser 14, and the charging device 20 is operated until the condenser 14 is fully charged, as indicated by a maximum reading on the voltmeter 16. When the apparatus is exposed to radiation, the dose rate may be measured at various times by causing the switch 22 to connect the voltmeter across the resistor 12 so that the voltage drop across the resistor is directly indicated on the voltmeter. The integrated dose is measured by observing the reading of the voltmeter 16 at the start and at the end of the period of time during which the measurements are made, with the voltmeter connected across the condenser 14 when the two readings are observed.

The arrangement shown in Fig. 4 is preferable if the voltmeter which is employed to make the measurements has a large time constant.

In this embodiment of the invention, the resistor 12 is located in the portion of the circuit which connects the ionization chamber to ground, so as to minimize the effects of stray capacitance between the resistor and ground. A pair of switches 24 and 26 are employed to connect the voltmeter 16 to the circuit, and the switches are arranged so that the voltmeter 16 can be shorted just before each reading is made. The capacitance of electrostatic voltmeters increases with increases in the voltage applied to the voltmeters; accordingly, more rapid voltmeter response is obtained if all the readings are started from zero rather than from a high voltage.

In operation, the switches 24 and 26 are positioned so that the voltmeter 16 is connected across the condenser 14 until the charging operation is complete. In order to measure the dose rate during the period of time when the integrated dose is being measured, the switches 24 and 26 are first positioned so that the voltmeter 16 is shorted and then the switch 26 is operated so that the voltmeter 16 is connected across the resistor 12. In order to measure the integrated dose at the end of a period of time, the switches 24 and 26 are first positioned so that the voltmeter 16 is shorted and then both the switches are operated so as to connect the voltmeter 16 across the condenser 14. The operation of switch 26 serves also to discharge small stray capacitances in the circuit so that it is of limited value unless condenser 14 has a capacitance large compared to any stray capacitance in the circuit.

I claim:

1. A combined radiological dose rate and integrated rate meter comprising an ionization chamber, a resistor connected in series with the ionization chamber, means for applying a potential across the serially connected resistor and ionization chamber, a potential measuring device directly connected to the series circuit in shunt arrangement, and switching means for altering the circuit so that the potential measuring device selectively measures a function of the potential appearing across the ionization chamber and a function of the potential drop across the resistor.

2. A combined radiological dose rate and integrated rate meter comprising an ionization chamber, a resistor, and a capacitor all connected in series in a circuit forming a closed loop; and means including a switch and a potential measuring device for selectively measuring a function of the potential across the capacitor and a function of the potential drop across the resistor.

3. The apparatus of claim 2, wherein the selective measuring means comprises a voltmeter connected in shunt across the ionization chamber, and a shorting switch connected in shunt across the resistor.

4. The apparatus of claim 2, wherein the selective measuring means comprises a voltmeter having one terminal coupled to the junction between the resistor and the capacitor, and a switch for selectively connecting another terminal of the voltmeter to the junction between the resistor and the ionization chamber or to the junction between the ionization chamber and the capacitor.

5. A combined radiological dose rate and integrated dose meter comprising a capacitor, a resistor and an ionization chamber all connected in series in a closed loop; a voltmeter; means for connecting the voltmeter in shunt with the capacitor; and means for connecting the voltmeter across the resistor and causing the voltmeter to provide an indication of the voltage drop across the resistor.

6. A combined radiological dose rate and integrated dose meter comprising a capacitor, a resistor, and an ionization chamber all connected in series in a closed loop; a voltmeter connected in shunt with the ionization chamber; and a switch connected in shunt with the resistor for providing a short circuit thereacross.

7. A combined radiological dose rate and integrated rate meter comprising an ionization chamber, a resistor, and a capacitor all connected in series in a circuit forming a closed loop; a voltmeter having one terminal coupled to the junction between the resistor and the capacitor; a switch for selectively connecting the other terminal of the voltmeter to the junction between the resisor on the ionization chamber or to the junction between the ionization chamber and the capacitor; and means for uncoupling said one terminal of the voltmeter from the junction between the resistor and the capacitor and providing a short circuit across the voltmeter.

8. A combined radiological dose rate and integrated dose meter, comprising a capacitor, a charging device connected across the capacitor for charging the capacitor to a predetermined level, a discharge path including a resistor and an ionization chamber connected serially across the capacitor, means for measuring a function of the instantaneous charge on the capacitor, and means for measuring a function of the instantaneous rate of current flow through the resistor.

9. A combined radiological dose rate and integrated dose meter, comprising a capacitor, a charging device for charging the capacitor to a predetermined level, a discharge path for the capacitor including a resistor and an ionization chamber connected serially across said capacitor, a voltmeter connected across said ionization chamber for measuring a function of the instantaneous charge on said capacitor, and means for selectively reducing the value of said resistor to zero to cause said voltmeter to register a change in potential corresponding to a function of the instantaneous current flow through said resistor.

10. A combined radiological dose rate and integrated dose meter, comprising a capacitor, a charging device connected across the capacitor for charging the capacitor to a predetermined level, a series circuit including a resistor and an ionization chamber connected across the capacitor to form a discharge path, a voltmeter connected across the ionization chamber for measuring a function of the cumulative current flowing through the ionization chamber, and means for selectively reducing the value of said resistor to zero to cause the voltmeter to measure a function of the instantaneous current flowing through the ionization chamber.

References Cited in the file of this patent

UNITED STATES PATENTS

| | | |
|---|---|---|
| 1,181,423 | Bangert | May 2, 1916 |
| 2,401,723 | Deming | June 11, 1946 |
| 2,490,674 | Christ et al. | Dec. 6, 1849 |
| 2,495,072 | Molloy | Jan. 17, 1950 |
| 2,496,886 | Molloy et al. | Feb. 7, 1950 |
| 2,503,730 | Hare | Apr. 11, 1950 |
| 2,524,901 | Fahrner | Oct. 10, 1950 |
| 2,584,844 | Constable | Feb. 5, 1952 |
| 2,651,726 | Froman et al. | Sept. 8, 1953 |